United States Patent [19]

Saitoh

[11] Patent Number: 5,418,801
[45] Date of Patent: May 23, 1995

[54] METAL VAPOR LASERS
[75] Inventor: Hiroshi Saitoh, Morioka, Japan
[73] Assignee: Chuo Electric Works Co., Ltd., Japan
[21] Appl. No.: 133,370
[22] Filed: Oct. 8, 1993
[51] Int. Cl.$^6$ ............................................. H01S 3/22
[52] U.S. Cl. ........................................ 372/56; 372/60
[58] Field of Search .............................. 372/56, 60, 55

[56] References Cited

U.S. PATENT DOCUMENTS 4,991,180  2/1991  Yamaguchi et al. ................... 372/56
5,283,800  2/1994  Suzuki et al. ......................... 372/60

Primary Examiner—James W. Davie
Attorney, Agent, or Firm—Wenderoth, Lind & Ponack

[57] ABSTRACT

To a laser medium comprising vapor of metal atoms A is added vapor of metal atoms B such that the difference $\Delta E(B)$ between the energy value $E_1(B)$ at the upper laser level and the energy value at the lower laser level $E_2(B)$ as the metastable state after laser transition or fluorescent transition is substantially equal to the energy level $E_2(A)$ of the metal atoms A at the lower laser level. Secondary collision of the metal atoms A in the $E_2(A)$ state and the metal atoms B in the $E_2(B)$ state with one another causes energy transition, whereby the metal atoms A do a work of exciting the metal atoms B to a resonant excitation level to lose its own energy and undergo transition to a ground level $E_0(A)$. Consequently, the excitation lifetime at the lower laser level in the laser transition is reduced to extend the inverse population time and also the laser output pulse width so as to increase the laser conversion efficiency.

4 Claims, 2 Drawing Sheets

METAL VAPOR LASERS

BACKGROUND OF THE INVENTION

Among various lasers (light amplification by stimulated emission of radiation) currently finding applcations in various fields, there are metal vapor lasers, in which electric pulse discharge is brought about in a tube containing vapor of a metal such as copper, manganese, lead, gold, calcium, barium, thallium, bismuth, etc., whereby metal atoms are excited with an intensive resonant trapping phenomenon for stimulated emission. The metal vapor laser has high output and energy conversion efficiency compared to other lasers, such as solid lasers, semiconductor lasers operable at normal temperature and gas lasers except for carbon oxide lasers and iodine lasers.

In such metal vapor laser, the discharge produced in the metal vapor in the tube produces resonant transition of atoms to an excited state, and some of the excited atoms undergo transition to a ground state or a metastable state by naturally emitting fluorescent light. When an inverse population state is eventually brought about so that the population of the excited atoms is higher than that of the metastable atoms, the fluorescent light acts with the excited atoms to cause stimulated emission of a new light beam. The new light beam thus generated is amplified as it is reflected by mirrors to be partly output as a laser beam from the output mirror.

With a copper vapor laser using copper as a lasant, strong oscillation lines with wavelengths of 510.6 and 578.2 nanometers exist in the visible wavelength region, and as high output power of several to several hundred Watts or more can be obtained with as high energy conversion efficiency as 1 to 1.2%. Thus, this laser finds applications as an exciter for dye lasers for uranium isotope separation and so forth. In addition, research on its application has been made in medical, industrial and various other fields.

In the metal vapor laser, however, while the excited metal atoms (i.e., atoms at the upper laser level) undergo transition by fluorescent light emission to energy levels of the ground state or metastable state, the populations of laser transitions are at a lower laser level, which is metastable level higher than the energy level of the ground state. While the lifetime of excitation at the upper laser level is several hundred nanoseconds, the transition from the lower laser level to the ground state is a forbidden transition, and the lifetime of excitation excitation at the lower laser level is far longer, i.e., several to several ten microseconds. This means that the state of inverse population is terminated at the commencement of the laser oscillation. In other words, the prior art metal vapor lasers are self-terminating lasers with the output pulse duration of at most several to several ten nanosconds.

If the lifetime of excitation at the lower laser level could be curtailed, the inverse population time will naturally be extended to extend the laser output pulse duration. If this is realized, not only the laser conversion efficiency can be increase, but also the possibility of continuous oscillating operation can be increased. The utility of the metal vapor lasers thus can be increased so that the lasers can find effective applications in various fields.

SUMMARY OF THE INVENTION

An object of the invention is to provide a metal vapor laser, which permits reducing the excitation lifetime at the lower laser level in the laser transition, thus increasing the energy conversion efficiency and possibility of continuous oscillation in the laser operation.

DETAILED DESCRIPTION OF THE PREFERRED EMBODIMENTS

Figure 1:
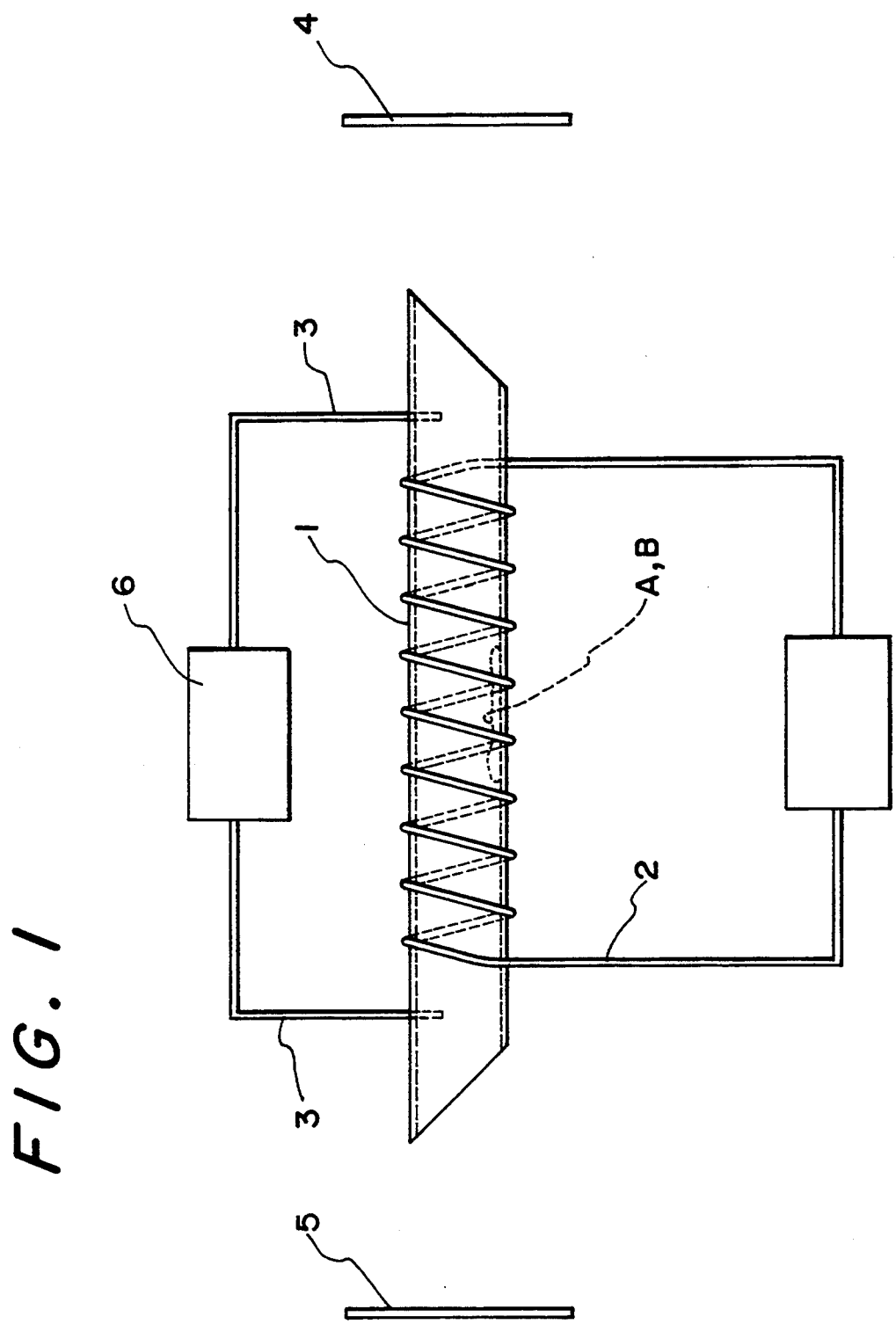
FIG. 1 is a view for explaining a metal vapor laser according to the invention.

FIG. 1 schematically shows a metal vapor laser according to the invention. Designated at 1 is a laser tube made of a ceramic or like material, at 2 a heater surrounding the laser tube 1 for heating the same to evaporate laser medium metal or metal compound A and metal or metal compound B, at 3 electrodes provided on the laser tube 1 near the ends thereof, at 4 a full reflection mirror, at 5 a semi-transmitting output mirror, and at 6 a power source.

The metals or their compounds A and B contained in the laser tube 1 are heated and evaporated by the heater 2, and in this vapor a pulse discharge is caused between the electrodes 3 from the power source 6. As a result, the metal atoms A are excited, and some of them naturally undergo transition into the ground state or metastable state by naturally-emitting fluorescent light. When an inverse population state is brought about, in which the population of the excited metal atoms A is greater than the metastable state population. In this state, the fluorescent light acts with the excited metal atoms A to cause stimulated emission of new light. The new light thus emitted is amplified as it is reflected between the mirrors 4 and 5 and is partly output as a laser beam from the output mirror 5.

Figure 2:
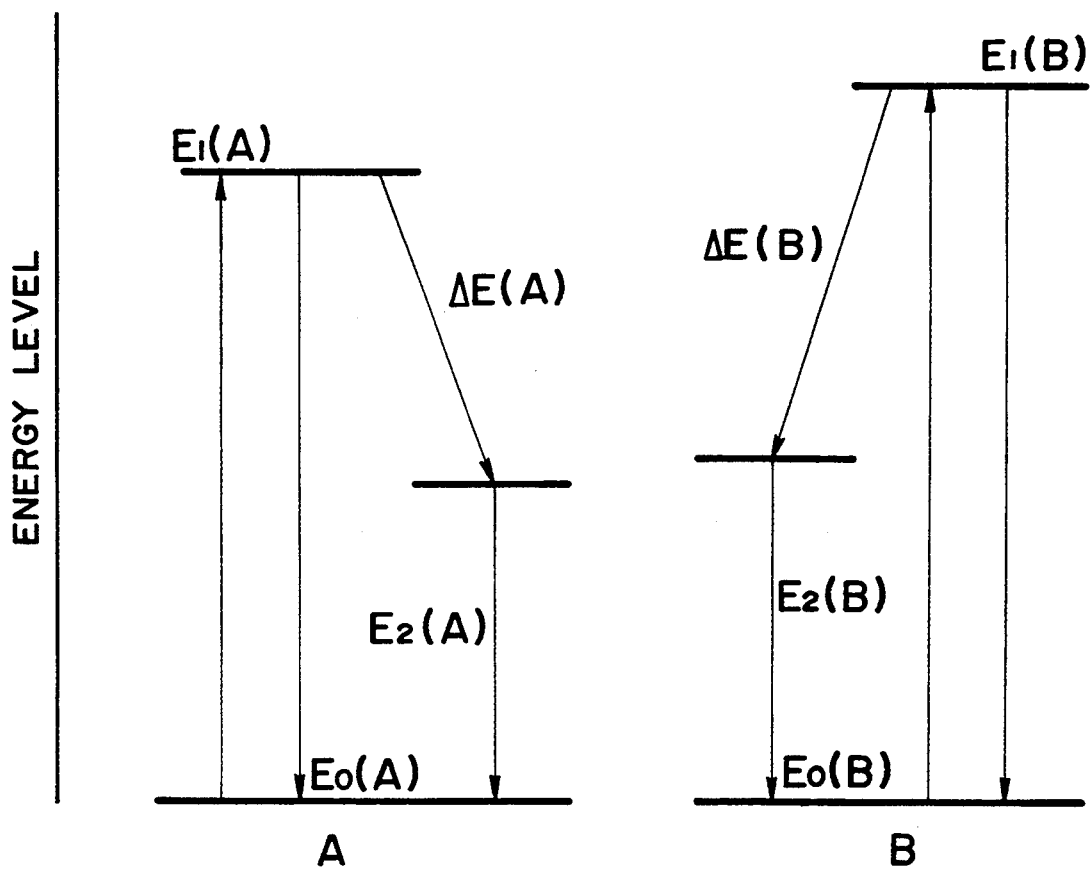
FIG. 2 is an energy level diagram of the metal vapor laser according to the invention.

FIG. 2 is a view showing energy levels in the metal vapor laser according to the invention. Shown on the left side are energy levels of the metal A, and on the right side are those of the added metal B. Shown at $E_0(A)$ and $E_0(B)$ are energy values of the metal atoms A and B in the non-excited ground state thereof. Shown at $E_1(A)$ and $E_1(B)$ are energy values of the metal atoms A and B at an upper level (resonant excitation level) of laser or fluorescence transition with excitation of the atoms cuased by the collision of electrons by the discharge between the electrodes 3. Shown at $E_2(A)$ is the energy level of the metal atoms A at a lower laser level as a population of the atoms in a metastable state brought about as a result of stimulated emission from the upper laser level. Shown at $E_2(B)$ is the energy level of the metal atoms B at a metastable level as a population of the atoms in the metastable state brought about as a result of fluorescent emission (or stimulated emission) from the upper laser level.

Shown at $\Delta E(A)$ is the energy value difference of the metal atoms A between $E_1(A)$ and $E_2(A)$, that is, the energy value necessary for exciting the metal atoms A at the lower laser level to the upper laser level. Shown at $\Delta E(B)$ is the energy value difference of the metal atoms B between $E_1(B)$ and $E_2(B)$, that is, the energy value necessary for exciting the metal atoms B at the lower level of fluorescent or laser transition to the upper level of fluorescent or laser transition.

The metal atoms A in the metastable state, i.e., at the lower laser level, and the metal atoms B at the metastable level of fluorescent or laser transition, can effect a work corresponding to the energy value of $E_2(A)$ and $E_2(B)$ and can consume energy efficiently for the work which substantially corresponds to this energy value.

In a first embodiment of the invention, the additive metal atoms B are selected such that the energy value $\Delta E(B)$ that is necessary for exciting the metal atoms B at the metastable level, i.e., the lower level of fluorescent or laser transition, to the resonant excitation level, is substantially equal to the energy value $E_2(A)$ of the lower laser level of the metal atoms A.

With the metal atoms B added to the metal atoms A as laser medium in this way, the metal atoms A undergo transition to the lower laser level by emitting laser to be held long in that state and undergo thermal motion that is determined by the laser tube temperature (of several hundred to several hundred thousand °C.) while holding the energy value of $E_2(A)$ and strongly and repeatedly colliding with nearby particles. The particles of the metal atoms B in the $E_2(B)$ state is behaving likewise. When the metal atom A in the $E_2(A)$ state collides with the metal atom B in the $E_2(B)$ state, it acts to excite the metal atoms B to the resonant excitation level $E_1(B)$, and it loses its own energy (deactivation) to undergo transition to the ground level $E_0(A)$. As for the inverse process, it probably can be ignored so long as $E_2(A)$ and $\Delta E(B)$ are sufficiently different from the energy values of the laser transition. Consequently, the excitation lifetime at the lower laser level is reduced to suppress increase of the particle number of the metal atoms A at the lower laser level. It is thus possible to extend the duration of the inverse population state, in which the particle number at the upper laser level is greater than that at the lower laser level, that is, increase the laser output pulse width, thus increasing the laser conversion efficiency.

Where the metal atoms A are manganese (Mn), the additive metal atoms B such as $\Delta E(B) \approx E_2(A)$ are europium (Eu), barium (Ba), lanthanum (La), molybdenum (Mo), niobium (Nb), platinum (Pt), rhenium (Re), ruthenium (Ru), titanium (Ti), thulium (Tm), etc.

Where the metal atoms A are cupper (Cu), the additive metal atoms B such as $\Delta E(B) \approx E_2(A)$ are europium (Eu), hafnium (Hf), lanthanum (La), niobium (Nb), titanium (Ti), zirconium (Zr), molybdenum (Mo), rhenium (Re), thorium (Th), tungsten (W), etc.

Where metal atoms A are arsenic (As), the additive metal atoms B such as $\Delta E(B) \approx E_2(A)$ are chromium (Cr), europium (Eu), iridium (Ir), lanthanum (La), manganese (Mn), platinum (Pt), rhenium (Re), scandium (Sc), tantalum (Ta), thorium (Th), zirconium (Zr), etc.

Where the metal atoms A are gold (Au), the additive metal atoms B such as $\Delta E(B) \approx E_2(A)$ are gadolinium (Gd), germanium (Ge), hafnium (Hf), iridium (Ir), molybdenum (Mo), rhodium (Rh), tantalum (Ta), thorium (Th), zirconium (Zr), etc.

Where the metal atoms A are barium (Ba), the additive metal atoms B such as $\Delta E(B) \approx E_2(A)$ are europium (Eu), hafnium (Hf), niobium (Nb), thorium (Th), titanium (Ti), zirconium (Zr), etc.

Of course, it is possible to select as the metal atoms A and B those other than noted above so long as the condition $\Delta E(B) \approx E_2(A)$ is satisfied.

In a second embodiment of the invention, the additive metal atoms B are selected such that the energy value $E_2(B)$ of the metal atoms B at the metastable level is substantially equal to the energy level $\Delta E(A)$ that is necessary for exciting the metal atoms A at the lower laser level to the resonant excitation level $E_1(A)$.

With the metal atoms B added to the metal atoms A as laser medium in this way, the metal atoms A in the $E_2(A)$ state and the metal atoms B in the $E_2(B)$ state collide with one another, and thus the metal atoms B act to excite the metal atoms A to the resonant excitation level $E_1(A)$ to lose energy (deactivation) and undergo transition to the ground level $E_0(B)$. As a result, the excitation lifetime at the lower laser level is reduced to suppress increase the particle number of the metal atoms A at the lower laser level and promote increase of the particle number at the upper laser level. Thus, it is possible to extend the duration of the inverse population state, in which the particle number at the upper laser level is greater than that at the lower laser level, that is, increase the laser output pulse width, thus increasing the laser conversion efficiency.

Where the metal atoms A are copper (Cu), the additive metal atoms B such as $E_2(B) \approx \Delta E(A)$ are europium (Eu), iron (Fe), osmium (Os), rhenium (Re), tungsten (W), yttrium (Y), manganese (Mn), etc.

Where the metal atoms A are manganese (Mn), the additive metal atoms B such as $E_2(B) \approx \Delta E(A)$ are arsenic (As), antimony (Sb), etc.

Where the metal atoms A are barium (Ba), the additive metal atoms B such as $E_2(B) \approx \Delta E(A)$ are tin (Sn), manganese (Mn), etc.

Where the metal atoms A are lead (Pb), the additive metal atoms B such as $E_2(B) \approx \Delta E(A)$ are europium (Eu), iridium (Ir), etc.

Where metal atoms A are thallium (Tl), the additive metal atoms B such as $E_2(B) \approx \Delta E(A)$ are arsenic (As), molybdenum (Mo), titanium (Ti), etc.

Of course it is possible to select the metal atoms A and B other than those noted above so long as the condition $E_2(B) \approx \Delta E(A)$ is satisfied.

In a third embodiment of the invention, the additive metal atoms B are selected such that the energy value $\Delta E(B)$ that is necessary for exciting the metal atoms B at the metastable level to the resonant excitation level is substantilly equal to the energy level $E_2(A)$ of the metal atoms A at the lower laser level and also that the energy level $E_2(B)$ of the metal atoms B at the metastable level is substantially equal to the energy level $\Delta E(A)$ that is necessary for exciting the metal atoms A at the lower laser level to the resonant excitation level. In other words, the metal atoms are selected such that they satisfy both the conditions of $\Delta E(B) \approx E_2(A)$ and $E_2(B) \approx \Delta E(A)$.

By adding the metal atoms B, which are laser medium like the laser medium metal atoms A, thus causing collision between the metal atoms A in the $E_2(A)$ state and the metal atoms B in the $E_2(B)$ state, the metal atoms A act to excite the metal atoms B to the resonant excitation level $E_1(B)$ to lose energy (deactivation) and undergo transition to the ground level $E_0(A)$, while the metal atoms B do a work of exciting the metal atoms A to the resonant excitation level $E_1(A)$ to lose energy (deactivation) and undergo transition to the ground level $E_0(B)$. As a result, the excitation lifetime of the metal atoms A and B at the lower laser level is reduced to suppress increase of the particle number of the metal atoms A and B at the lower laser level. On the other hand, the particle number of the atoms at the upper laser level is increased to extend the duration of the inverse population state, in which the particle number at the upper laser level is greater than that at the lower laser level, thus increasing the laser output pulse width to increase the laser conversion efficiency of both the atoms A and B.

In the above embodiments, it is necessary that the energy level of the additive metal atoms B is free from such inter-action to impede the laser oscillating operation of the laser medium metal atoms A. The ratio between the vapor pressures of the metal atoms A and B is selected suitably with an aim of extending the duration of the inverse population state, but the ratio may be about one versus one.

The set-up of the metal vapor laser shown in FIG. 1 is only model-wise, and where the metals or metal compounds A and B have different gasification temperatures, an exclusive heater is provided for each of the metals for controlling the vapor pressure for each metal.

As has been shown, with the metal vapor laser according to the invention, to the laser medium metal atoms is added the vapor of other metal atoms capable of energy transition of the laser medium metal atoms with secondary collision, and thus the excitation lifetime at the lower laser level in the laser transition can be reduced to extend the inverse population lifetime and also the laser output pulse width. Thus, not only the laser conversion efficiency but also the possibility of continuous oscillation operation can be increased, thus permitting the utility increase of the metal vapor laser and effective applications thereof in various fields.

What is claimed is:

1. A metal vapor laser, in which vapor of a metal is contained as a laser medium in a tube for exciting the metal atoms by discharge to an upper laser level (resonant excitation level) in an excited state for stimulated emission, and also in which vapor of different metal atoms is added to said laser medium, said other metal atoms being such that the difference between the energy value at the resonant excitation level and the energy level at the lower laser level as a metastable state after laser transition or fluorescent transition is substantially equal to the difference between the energy value of said metal atoms in the ground state and the energy value at the lower laser level, said metal atoms at the lower laser level being thereby caused to undergo transition to the ground state with energy transition caused by secondary collision between said metal atoms at the lower laser level and said other metal atoms at the lower laser level as the metastable state, thus extending the duration of inverse population state with the number of said metal atoms at the upper laser level being greater than the number of said metal atoms at the lower laser level.

2. A metal vapor laser, in which vapor of a metal is contained as a laser medium in a tube for exciting the metal atoms by discharge to an upper laser level (resonant excitation level) in an excited state for stimulated emission, and also in which vapor of different metal atoms is added to said laser medium, said other metal atoms being such that the difference between the energy value at the ground level and the energy value at the lower laser level as a metastable state after transition or fluorescent transition is substantially equal to the difference between the energy value of said metal atoms at the upper laser level and the energy at the lower laser level, said metal atoms at the lower laser level being thereby caused to undergo transition to the upper laser level with energy transition caused by secondary collision between said metal atoms at the lower laser level and said other metal atoms at the lower laser level as the meastable state, thus extending the duration of inverse population state with the number of said metal atoms at the upper laser level being greater than the number of said metal atoms at the lower laser level.

3. A metal vapor laser, in which vapor of a metal is contained as a laser medium in a tube for exciting the metal atoms by discharge to an upper laser level (resonant excitation level) in an excited state for stimulated emission, and also in which vapor of different metal atoms is added to said laser medium, said other metal atoms being such that the difference between the energy value at the upper laser level and the energy value at the lower laser level as a metastable state after laser transition is substantially equal to the difference between the energy value of said metal atoms in the ground state and the energy value at the lower laser level and that the difference between the energy value in the ground state and the energy value at the lower laser state as the metastable state after laser transition is substantially equal to the difference between the energy value of said metal atoms at the upper laser level and the energy value at the lower laser level, said metal atoms and said other metal atoms at the lower laser level being thereby caused to undergo transition to the ground state and the upper laser level, respectively, with energy transition caused by secondary collision between said metal atoms at the lower laser level and said other metal atoms at the lower laser level as the metastable state, thus extending the duration of inverse population state with the number of said metal atoms at the upper laser level being greater than the number of said metal atoms at the lower laser level.

4. The metal vapor laser according to one of claims 1 to 3, wherein said other metal atoms added to said laser medium metal atoms are at an energy level incapable of inter-action to impede the laser oscillating operation of said laser medium metal atoms.

* * * * *